UNITED STATES PATENT OFFICE.

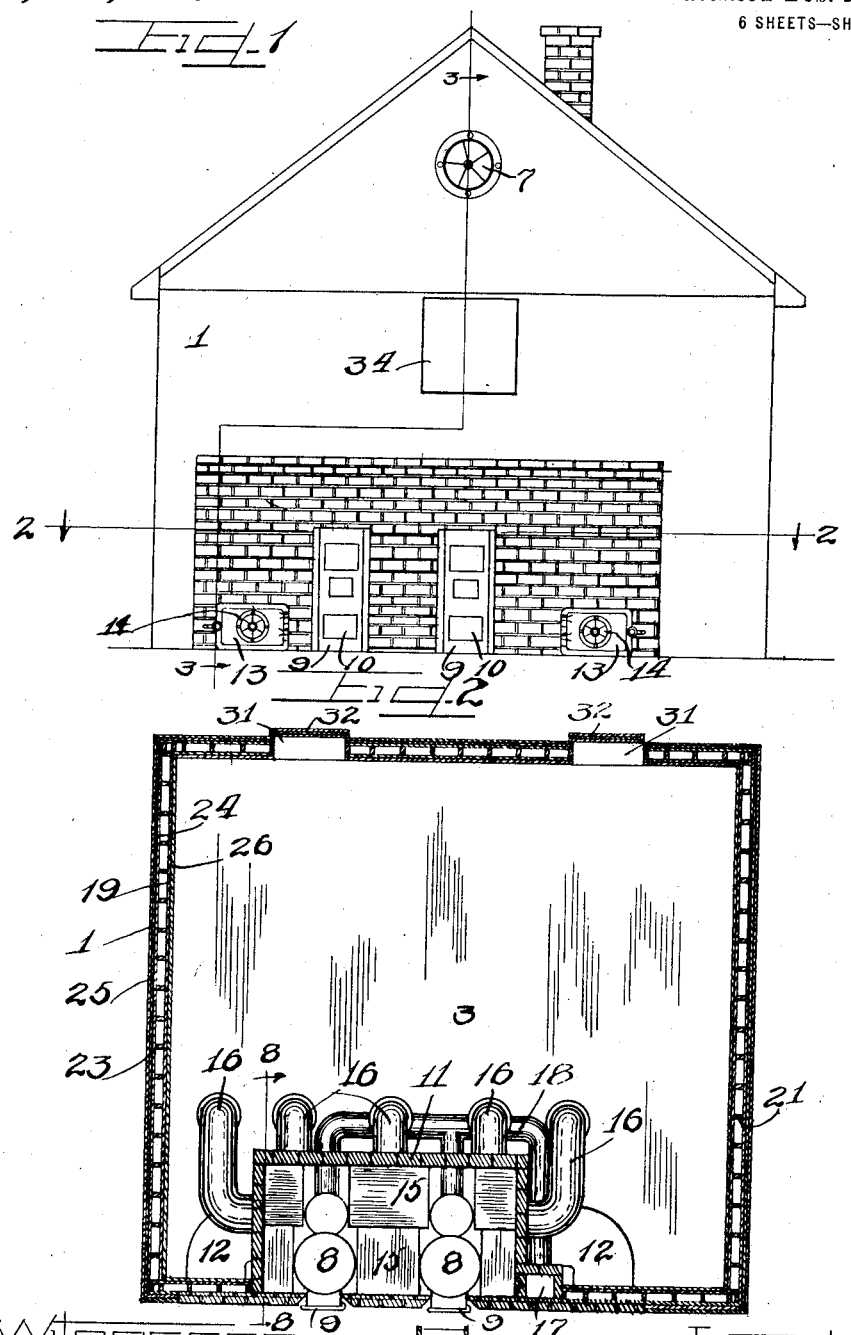

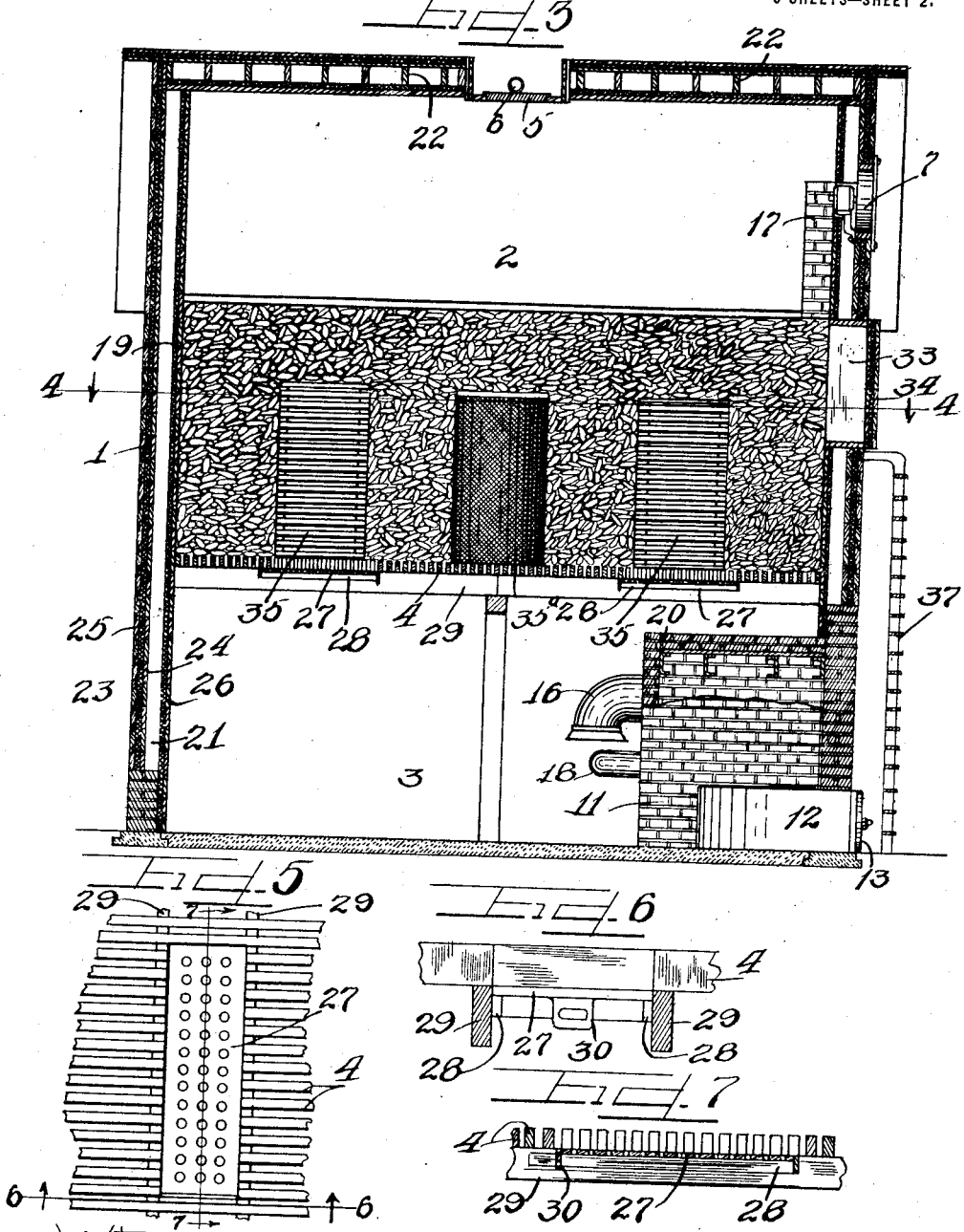

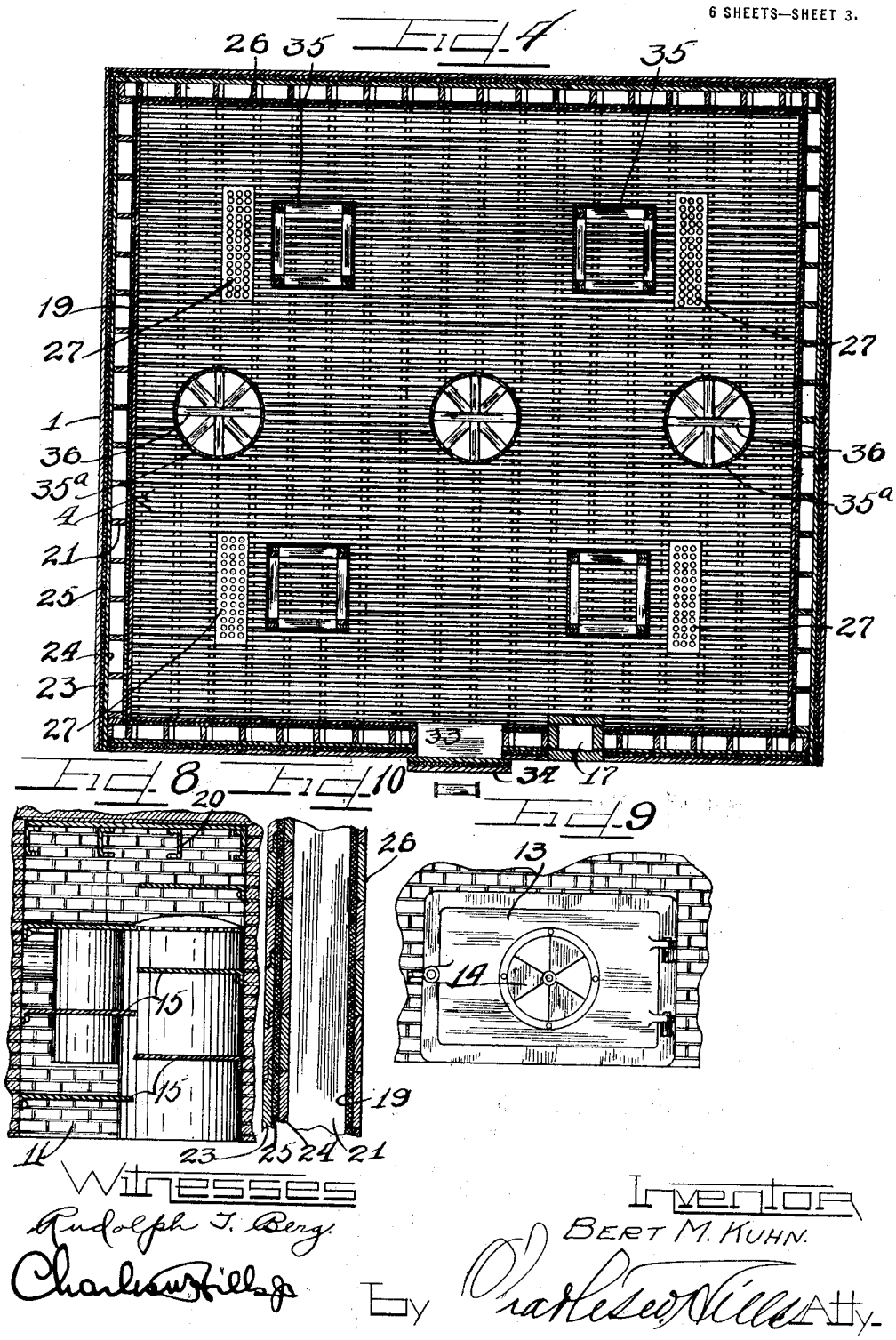

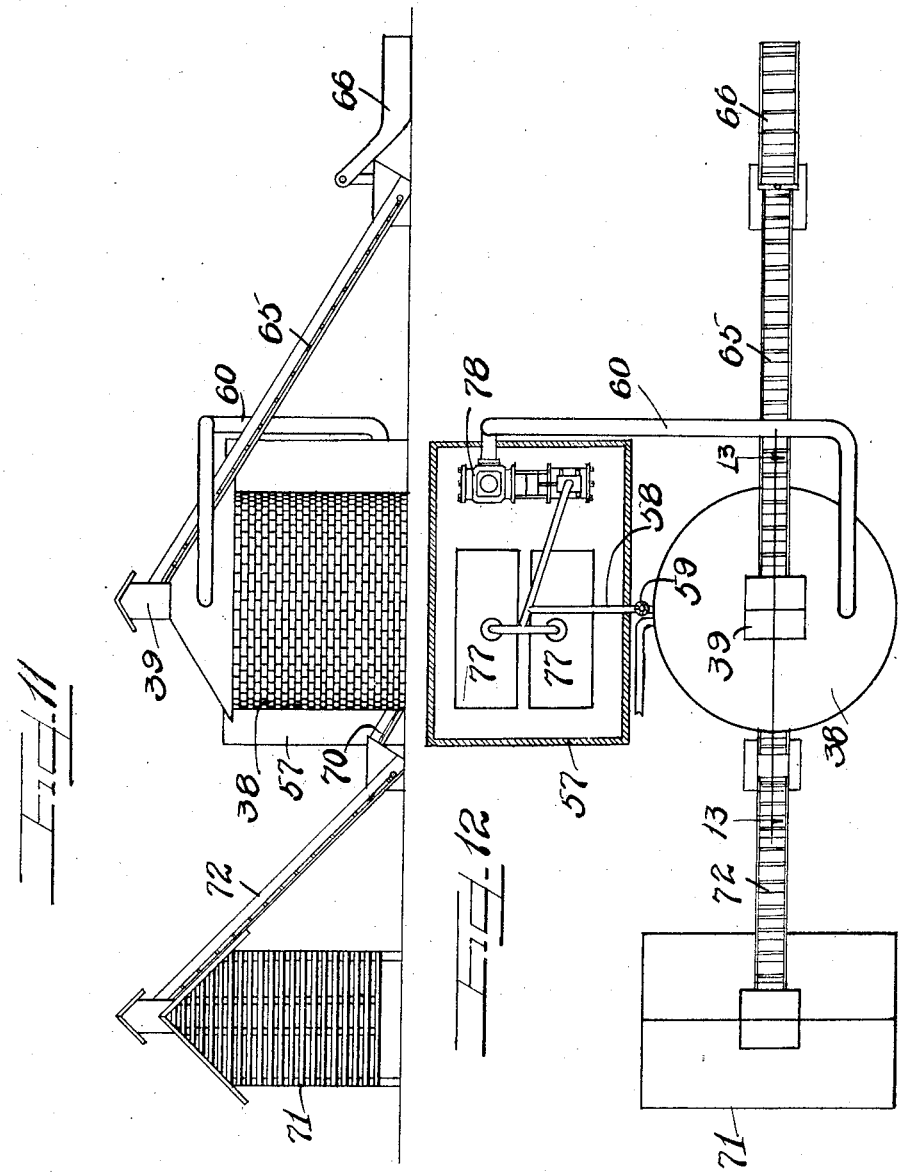

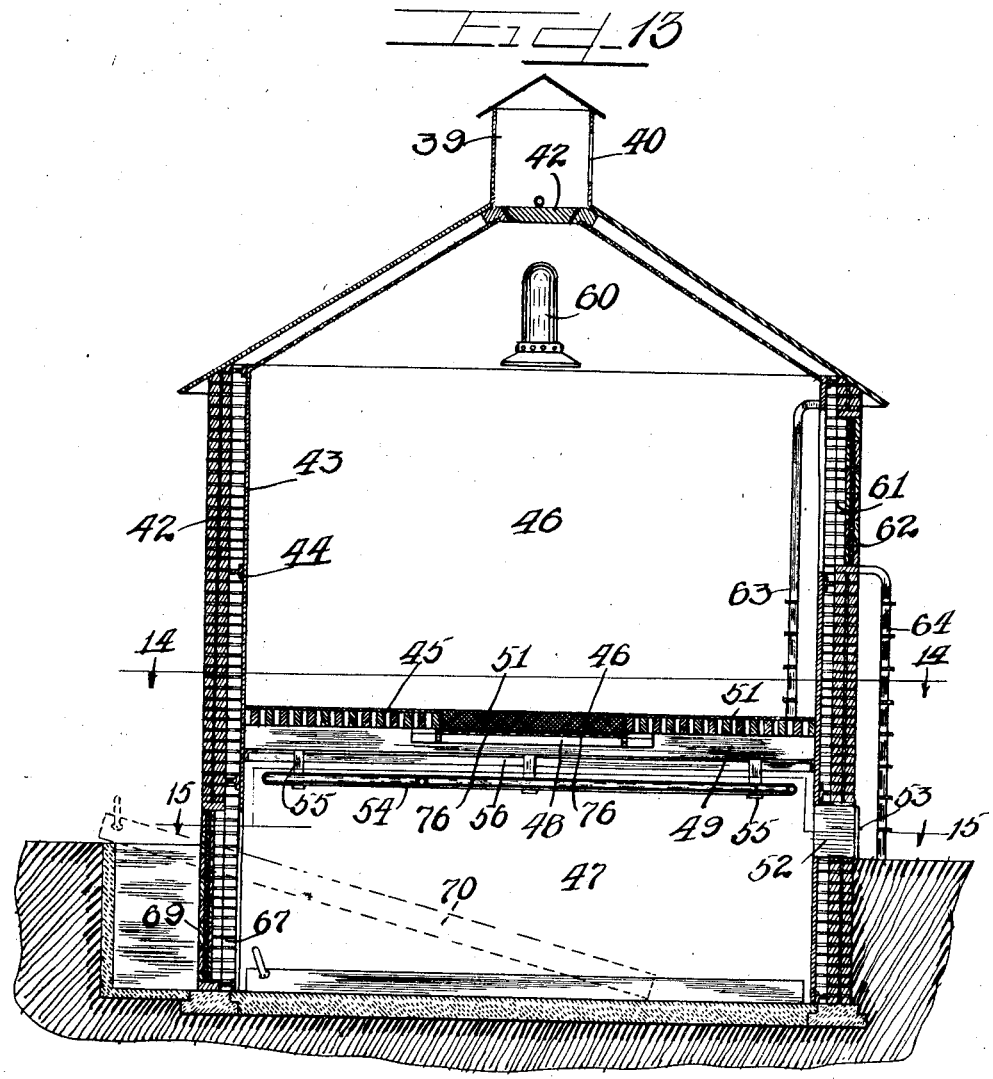

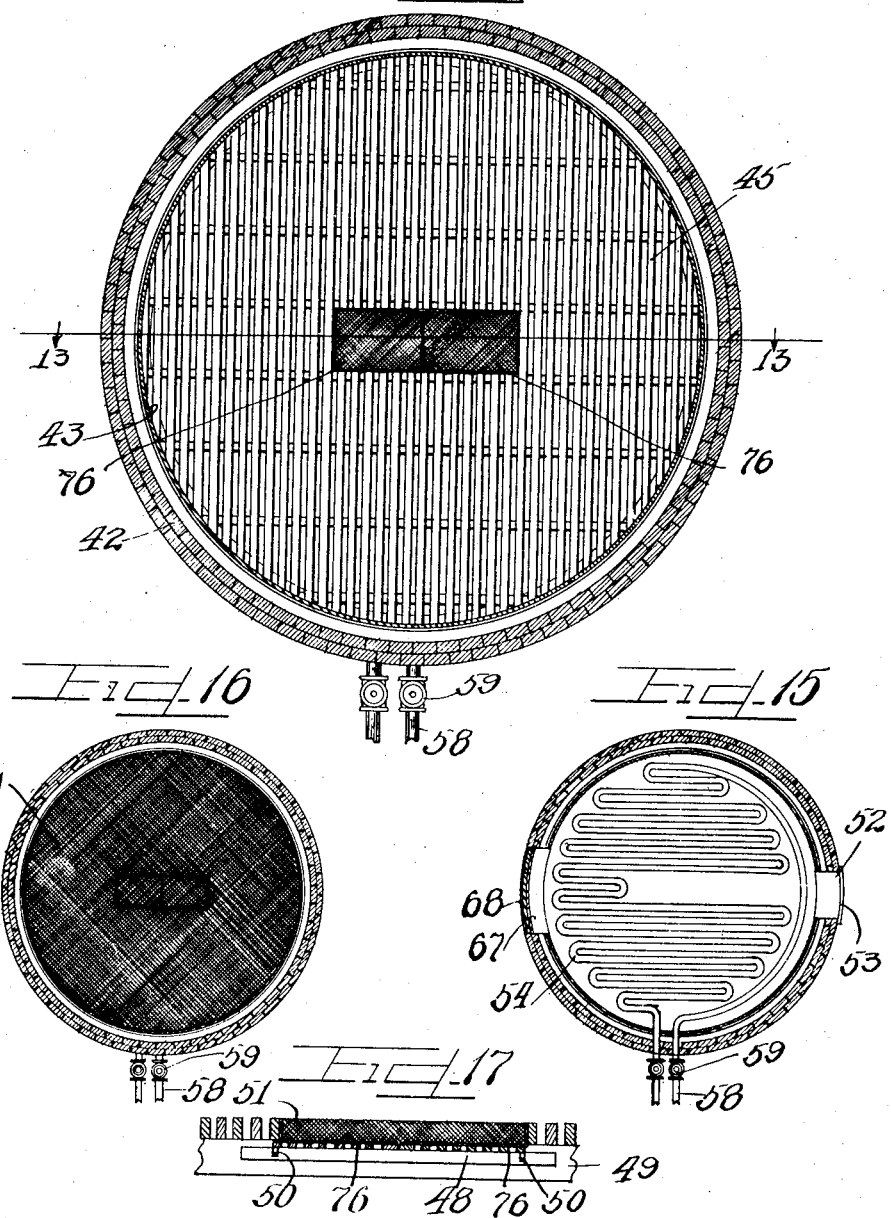

BERT M. KUHN, OF BLOOMINGTON, ILLINOIS.

DRIER.

1,330,195.   Specification of Letters Patent.   Patented Feb. 10, 1920.

Application filed February 25, 1918. Serial No. 219,120.

*To all whom it may concern:*

Be it known that I, BERT M. KUHN, a citizen of the United States, and a resident of the city of Bloomington, in the county of McLean and State of Illinois, have invented certain new and useful Improvements in Driers; and I do hereby declare that the following is a full, clear, and exact description of the same, reference being had to the accompanying drawings, and to the numerals of reference marked thereon, which form a part of this specification.

This invention has reference more particularly to a drier which is particularly suited, though not necessarily limited, for use on a farm to dry the grain or other product as it is brought in from the field and before it is stored away, and comprises a structure in which the grain or other product is placed and treated to extract the moisture therefrom.

An object of the invention is to thoroughly extract the moisture from grain or other product so that it will grade higher under the market test or may be safely stored without danger of deterioration on account of the presence of moisture therein.

Another object of the invention is to remove moisture from the mass of grain or other product by applying suction thereto and thereby drawing air through the mass of grain to carry off the moisture therefrom.

Another object of the invention is to remove moisture from the grain or other product by applying heated air thoroughly to a mass of grain.

Another object of the invention is to apply suction and heat to the mass of grain so that the moisture will be extracted and removed by the suction and the grain thoroughly dried by heated air drawn through the mass of grain.

Another object of the invention is to inclose the material to be dried in a suction compartment and apply heated air under the material to be drawn by suction through the mass of grain.

Another object of the invention is to distribute the heated air uniformly through the mass of grain and also provide heated air to all parts of the mass of grain so that all of the grain will be thoroughly dried.

Another object of the invention is to provide a grain compartment with flues projecting into the mass of grain and suitably spaced so as to supply and distribute the air for drying the grain uniformly throughout the entire mass.

Another object of the invention is to supply grain to the top of a grain drying compartment and withdraw the grain from the bottom thereof.

Another object of the invention is to convey grain to a grain drier and after drying to take the grain from the drier and convey it to a place of final storage.

Another object of the invention is to provide a compartment that is thoroughly closed and has means for regulating the admission of air so that the heat and suction in the grain compartment can be regulated.

Another object of the invention is to provide a heater in connection with a grain drying compartment which may be attended without entering the compartment or disturbing the draft or other conditions in the compartment.

This invention also has other important objects which will appear from the disclosure in the drawing and the following specification.

The invention (in a preferred form) is illustrated in the drawings and hereinafter more fully described.

On the drawings:

Figure 1 is an end view of a grain drier constructed in accordance with my invention.

Fig. 2 is a horizontal sectional view on the line 2—2 of Fig. 1.

Fig. 3 is an enlarged vertical sectional view substantially on the line 3—3 of Fig. 1.

Fig. 4 is a horizontal sectional view on the line 4—4 of Fig. 3, the contents of the drying compartment being omitted.

Fig. 5 is an enlarged top view of one of the valves in the bottom of the grain drying compartment which appear in Fig. 4.

Fig. 6 is an enlarged sectional view on the line 6—6 of Fig. 5.

Fig. 7 is a sectional view on the line 7—7 of Fig. 5.

Fig. 8 is an enlarged horizontal sectional view on the line 8—8 of Fig. 2.

Fig. 9 is a front view of the door and damper which is provided for controlling the admission of air.

Fig. 10 is an enlarged fragmentary vertical sectional view of the wall of the drier.

Figs. 11 and 12 are side and top plan views respectively (the latter showing parts in section), of a complete equipment for drying grain and storing the grain from the drier and also shows mechanism for supplying grain to the drier and conveying the grain from the drier to the storage bin, the said views illustrating a modified form of drier.

Fig. 13 is an enlarged vertical sectional view of the modified form of drier taken on the line 13—13 of Fig. 14.

Fig. 14 is a horizontal sectional view taken on the line 14—14 of Fig. 13.

Fig. 15 is a reduced horizontal sectional view taken on the line 15—15 of Fig. 13.

Fig. 16 is a reduced view similar to Fig. 14 showing a modified structure for handling small grain.

Fig. 17 is an enlarged sectional view of the outlet valve from the drying compartment taken on the line 13—13 of Fig. 14.

As shown on the drawings:

Referring first to Figs. 1 to 9, inclusive, 1 is a building which is divided into the upper and lower compartments, 2 and 3, respectively by means of the grated floor or partition 4, which is constructed with the strips, which form the floor, arranged close enough together so as to hold ear corn and permit free circulation of air therethrough. The upper compartment 2 is designed to contain the grain during the drying operation and has a trap door 5, closing an opening at the peak of the roof through which grain is supplied to the upper compartment. This trap door is provided with a ring 6, so that it can be easily removed and is so fitted that when closed it will thoroughly seal the opening through which the grain is supplied to the upper compartment. The grain in the compartment 2, is dried by being subjected to heat and also suction which circulates the heated air thoroughly through the mass of grain and withdraws the moisture extracted from the grain,—and to provide suction for this purpose, an exhaust fan 7, is mounted in one end wall in the gable of the building so as to be above the level of the grain in the compartment.

To supply the heat for drying the grain, the lower compartment 3, has a pair of hot air furnaces 8, adjacent one side of the building, which have the furnace fronts 9, thereof, projecting through the wall of the building so that the furnace doors 10, are accessible from the outside of the building. These furnaces are inclosed in a masonry casing 11, to provide a heating compartment for air, the top of which said casing is supported on the channel irons 20, and a pair of inlet air ducts 12, communicate with the compartment near the bottom and open to the exterior of the building for supplying air to be heated by the furnaces. The exterior openings of these ducts are provided with a door 13, which effectively closes the entrance to the duct, and may be opened to regulate admission of air to the drier and there is a damper 14, in the door which may also be adjusted for the same purpose, so as to regulate the degree of vacuity maintained in the compartment.

The casing 11, of the furnace 8, has a number of horizontal baffle plates 15, arranged in a staggered relation so that the air which is admitted to the casing through the air inlets 12, is compelled to travel a circuitous path to the top of the casing so as to be thoroughly heated, and it is then exhausted into the lower compartment 3 through a series of ducts 16, which have their outlet ends turned downwardly so as to discharge the heated air therefrom away from the floor 4, of the grain compartment. This arrangement not only results in a thorough dissemination of the heated air so that it is supplied evenly to the under surface of the floor 4, but also prevents overheating of portions of the grain which might occur if the outlet ends of the pipes 16 were turned upwardly and the heated air therefrom permitted to come immediately on contact with the grain. A stack 17, is built in the wall of the building and the smoke flue 18, which leads from both furnaces 8, connects with this flue.

It is intended that the building shall be thoroughly inclosed so as to prevent admission of air except through the air inlets 12, and that it shall also be insulated to maintain the desired temperature in the building. To this end, the walls and the roof of the building are constructed of the studs and roof joists 21 and 22, respectively, on the outside of which is secured the double sheeting 23—24, which has a lining 25, interposed which serves to retain the heat within the building and also to make a tight wall and prevent admission of air. At the inside of the studs and roof joists is another layer of lining material 19, over which the inside sheeting 25, is placed. This provides a wall and roof which on account of the double lining 25 and 19, is practically impervious to air and insulates the building to maintain the heat therein, this latter also being effected by the air space between the inner and outer coverings of the wall and roof.

The grain or other material to be dried is delivered to the compartment 2, through the trap door 5, and heated air supplied in suitable quantities to the grain through the grated floor 4, and the air withdrawn from the upper compartment 2, by means of the fan 7, until the grain is thoroughly dried, after which it is removed from the compartment 2, to make way for another batch of grain to be dried. For removing the grain from the compartment 2, the floor 4, is provided with a number of openings, four being shown in the present instance, which are closed by the valves 27, which slide in the ways 28, between the floor joists 29, and are provided with handles 30, whereby they may be easily operated. These valves are perforated as shown in Figs. 4 and 5, to provide air circulation therethrough to the grain above. When the valves 27, are opened, the grain falls into the compartment 3, and may be removed in any convenient manner. I have contemplated, however, using a conveyer drag which may be inserted through the doorway 31, and arranged under the openings of the valves 27, so that the grain will fall into the drag and be carried outside of the building through the doorways 31, to any point desired. The doorways 31, are normally closed tight by means of the doors 32, and the doorway 33, which is provided to the upper compartment 2, also has a tight closing door 34, so that the building may be entirely sealed to insure thorough treatment of the grain.

If the compartment 2 is filled uniformly to a given depth with the grain to be dried and no provision made for introducing the heated air into the interior of the mass of grain, the moisture will be extracted first from the grain at the bottom of the mass, and the grain thereabove will be subjected to the moisture laden air resulting from the drying of grain below and thereby prevented from drying until the grain at the bottom of the compartment is nearly dried and ceases to give off moisture.

In order to obviate this uneven drying and expedite the thorough treatment of the entire mass of grain, I have provided a number of flues 35 and 35$^a$, extending up from the bottom or floor 4, of the compartment 2, and which are closed at the upper ends and spaced preferably in staggered relation as shown in Fig. 4, and the compartment is filled with the grain to be dried to a depth above the upper ends of the flues 35 and 35$^a$, as shown in Fig. 3, so that all the grain in the compartment is within a given distance from a flue. Thus the heated air is introduced into the mass of grain and distributed uniformly therethrough and the drying is more evenly and quickly accomplished.

The flues 35 and 35$^a$ are constructed separate from the building and are merely set upright on the floor 4 at any point desired, it being intended that the number and placing thereof shall be governed by the condition of the grain, which may require a greater or less number of flues or a close or wide spacing in order to give the desired ventilation or supply of heated air to the various portions of the mass of grain. These flues may also be variously constructed and in the present illustration I have shown one form, indicated at 35, which is rectangular in shape and slatted and may be used in drying ear corn or other products of similar size. Another form, which is indicated at 35$^a$, consists of a cylinder of screen wire which is built upon a frame structure 36, as shown in Fig. 4, and this form is suitable for use in drying small grain as well as larger products such as ear corn.

The door 34, to the upper compartment, is placed at a considerable distance above the floor so that entrance may be had to the compartment when there is a quantity of grain therein, and to provide access to this opening there is a ladder 37, on the outside of the building leading up to the opening.

Referring now to Figs. 11 to 17, inclusive, in which a modified form of drier is shown, and also a complete equipment for conveying the grain to the drier, and also conveying the grain from the drier to the final storage bin, 38 is the drying building which has the pent house 39, at the center of the roof having an opening 40, in the side thereof through which the spout of a grain elevator 65, may be inserted for supplying grain to the drier. A valve 42, is provided at the bottom of the pent house 39, which may be opened when grain is to be supplied to the drier, and which when closed, thoroughly seals the opening through which the grain is introduced.

This drier is constructed in a circular shape although it is not necessarily so, and has the outer double wall 42, and the inner lining 43, which is spaced and held therefrom by means of the angle irons 44, so as to provide an air space intermediate of the wall and the lining.

This drier is divided horizontally by means of the slatted partition 45, into an upper and a lower compartment 46 and 47, respectively, the upper compartment of which is for containing the grain to be dried and the lower compartment of which is to supply heated air to dry the grain. Centrally located in the floor 45 is a discharge opening which is closed by a pair of valves 76, which are mounted on ways 48, between the sills 49, of the floor 45, each of which said valves is provided with a handle 50, for operating the valve. These valves are perforated as shown in Fig. 17, to provide air circulation therethrough to dry the grain, these perforated valves and the slatted construction of the floor 45, being adapted for drying ear corn or any other product of similar size.

This drier, as well as the one previously described, may be arranged for treating small grain or other similar product by covering the floor 45, the valves 76, and any opening through which the small grain might escape, with a screen wire 51.

Air, for drying the grain, is supplied to the lower compartment 47, through a number of openings 52, located around the wall of the drier 38, below the floor 45, and these openings are closed by means of the doors 53, which are similar to the door shown in Fig. 9, and may be opened to regulate the quantity of air to the drier.

For heating the air previous to its circulation through the grain, there is a coil 54, for steam or hot water, which is suspended by means of hangers 55, to an angle iron frame 56, directly below the floor 45, so that all the air that passes through the floor 45, is heated by the steam coil 54. A heater consisting of the boilers 77, is placed in the building 57, which building may be separate from the drier 38, or connected therewith if desired, and is connected by means of the pipe 58, and the valve 59, to the coil 54, for supplying heat to the drier. A vacuum pump or other suction machine 78, the power for which may be furnished from the boilers 77, is also placed in the building 57 and connected by means of a duct 60, to the upper part of the compartment 46, so as to exhaust the air and withdraw the moisture from the said compartment. This drier may be supplied with flues such as shown at 35 and 35ª in Figs. 3 and 4, if desired, to distribute the heated air uniformly through the mass of grain in the compartment 46.

To provide access to the compartment 46, there is an opening 61, placed at a distance above the floor 45, and normally closed tight by means of the door 62, and there are inside and outside ladders 63 and 64, respectively, to provide access to the said opening.

The grain elevator 65, previously referred to, which supplies the grain to the drier has the drag or hopper 66, at the lower end adapted to have the grain supplied directly thereto from the wagon or otherwise supplied if desired.

For taking the grain from the drier there is an opening or doorway 67, from the lower compartment 47, which is normally closed tight by means of a door 68, and communicates with an area 69, through which access is had to the compartment 47. A conveyer or drag 70, which may normally be contained in the compartment 47, as shown at 70, in Fig. 13, is arranged directly below the opening 46 through the floor 45, so as to receive the grain as it falls through the opening. This conveyer may be projected through the opening 67, as shown by the dotted lines in Fig. 13, and connected with suitable driving machinery so as to carry the grain to the exterior of the compartment 47. A bin or granary 71, for final storage of the grain, may be located conveniently near the drier 37, and the conveyer 70, may be arranged to discharge into the lower end of the elevator 72, the upper end of which discharges into the top of the bin or granary 71.

I have shown the complete outfit of Figs. 11 and 12, in connection with the drier 38, but it is to be understood that the drier shown in Figs. 1 to 9 may be used in place of the drier 38, and furthermore either of these driers may be used without the final storage bin as shown in Figs. 11 and 12, without departing from the spirit of my invention.

The operation is as follows:

Assuming that we have the complete equipment shown in Figs. II and 12,—a wagon loaded with the grain to be dried, will be dumped into the drag or hopper 66, or will be otherwise supplied and carried by means of the elevator 65, to the top of the grain drier and discharged into the upper compartment of the drier. The suction mechanism and heating plant will then be operated and air will be supplied and regulated so as to maintain a pressure below atmospheric in the drier to withdraw the moisture from the grain. After the grain is thoroughly dried, the valves in the bottom of the upper compartment of the drier are opened and the grain which falls therethrough is carried by the conveyer 70, and the elevator 72, to the final storage bin 71, or may be otherwise disposed of. In the driers shown in Figs. 1 to 9, inclusive, the hot air is supplied directly by the heating plant, and the ventilation of the drier is controlled by regulating the opening of the inlet ducts 12, which supply air to be heated by the furnaces.

The action of the drier in Figs. 11 to 17, inclusive, is similar to that of the preceding figures, except that the heating element consists of a coil and there are air inlets leading directly into the lower compartment and passing through the coil 54, to the upper compartment 46.

In the drying operation I have found that the best results are obtained, particularly with ear corn by first heating the mass of corn in the compartment to a high temperature after which the suction mechanism is set in operation and the temperature allowed to diminish somewhat while the air is circulated through the grain.

While I have herein referred to this drier as being used in connection with the drying of grain, I do not limit its use thereto but contemplate using it for drying or treating any material, and I am also aware that various details of construction may be varied through a wide range without departing from the principles of this invention. I therefore do not purpose limiting the patent granted otherwise than necessitated by the prior art.

I claim as my invention:

1. In a drier, the combination of a structure having a lower and an upper compartment, a reticulated partition separating the compartments, means for supplying heated air to the lower compartment, and a reticulated flue communicating with the lower compartment and resting on and movable over the surface of the reticulated partition.

2. In a drier, the combination of a structure having a drying compartment for containing the material to be dried, and an auxiliary compartment for supplying heated air to the drying compartment, and a plurality of movable reticulated flues extending from the auxiliary compartment into the drying compartment.

3. In a drier, the combination of a structure having an upper compartment for containing the material to be dried, a lower compartment, and a reticulated partition intermediate of the said compartments, a heater in the lower compartment provided with a plurality of hot air ducts for supplying heated air to the upper compartment, the said heater being provided with a fuel inlet and an air inlet at the exterior of the compartment, the latter inlet being provided with means for regulating the quantity of air to be supplied to upper compartment.

4. In a drier, the combination of a structure having an upper and a lower compartment, a reticulated partition intermediate of the compartments, means for supplying heated air to the lower compartment, and a plurality of reticulated flues resting on and movable over the surface of the partition.

5. In a drier, the combination of a structure having upper and lower compartments, a reticulated partition intermediate the compartments, means for supplying heated air to the lower compartment, and a plurality of flues resting on and movable over the surface of the partition, said flues having open bottoms and reticulated sides and tops.

In testimony whereof I have hereunto subscribed my name in the presence of two subscribing witnesses.

BERT M. KUHN.

Witnesses:
CHARLES W. HILLS, Jr.
FRED E. PAESLER.